United States Patent [19]

Anderson et al.

[11] 4,311,261
[45] Jan. 19, 1982

[54] MOTORCYCLE FUEL TANK CARRYING RACK

[76] Inventors: Gordon K. Anderson, 14632 Pacific St., Tustin, Calif. 92680; James D. King, 6735 Pasito Ave., Alta Loma, Calif. 91701

[21] Appl. No.: 154,940

[22] Filed: May 30, 1980

[51] Int. Cl.³ .............................................. B60P 3/22
[52] U.S. Cl. .................................. 224/31; 224/32 A; 280/5 A; 297/217; 297/243
[58] Field of Search ...................... 224/30 R, 30 A, 31, 224/32 R, 32 A; 280/5 R, 5 A, 5 F, 5 H, 202, 289 R, 289 A, 769; 180/22 S; 137/255, 344, 351, 571, 572, 574; 297/217, 243, DIG. 9

[56] References Cited

U.S. PATENT DOCUMENTS

| 639,490 | 12/1899 | Almond | 280/5 A |
| 1,121,580 | 12/1914 | Burkett et al. | 224/31 |
| 3,512,795 | 5/1970 | Naeve | 280/5 A |
| 3,671,070 | 6/1972 | Johnson et al. | 280/5 A X |
| 3,696,979 | 10/1972 | Erickson | 280/5 A X |
| 3,893,678 | 7/1975 | Engdahl | 280/5 A |
| 4,059,207 | 11/1977 | Jackson et al. | 224/31 |
| 4,175,630 | 11/1979 | Fleisher et al. | 280/5 A X |
| 4,260,085 | 4/1981 | Jefferson | 224/32 R |

FOREIGN PATENT DOCUMENTS

| 925693 | 9/1947 | France | 224/30 R |
| 1086064 | 2/1955 | France | 224/32 A |
| 516766 | 2/1955 | Italy | 180/22 S |
| 541582 | 4/1956 | Italy | 280/289 A |
| 180956 | 6/1922 | United Kingdom | 280/5 A |

Primary Examiner—Stephen Marcus

[57] ABSTRACT

A combination fuel tank and carrying rack for a motor driven cycle with a rectangular tank having a fill pipe on the top with a cap and a gravity type fuel system. The top of the tank includes vertical side legs with slots and parallel rubrails to attach items for transporting. The tank further contains undercarriage arms and struts attaching directly to the motorcycle through fasteners provided thereon. Other embodiments include a travel trunk mounting channel attached rotatably to the side legs and a backrest with a cushion on the forward end.

8 Claims, 15 Drawing Figures

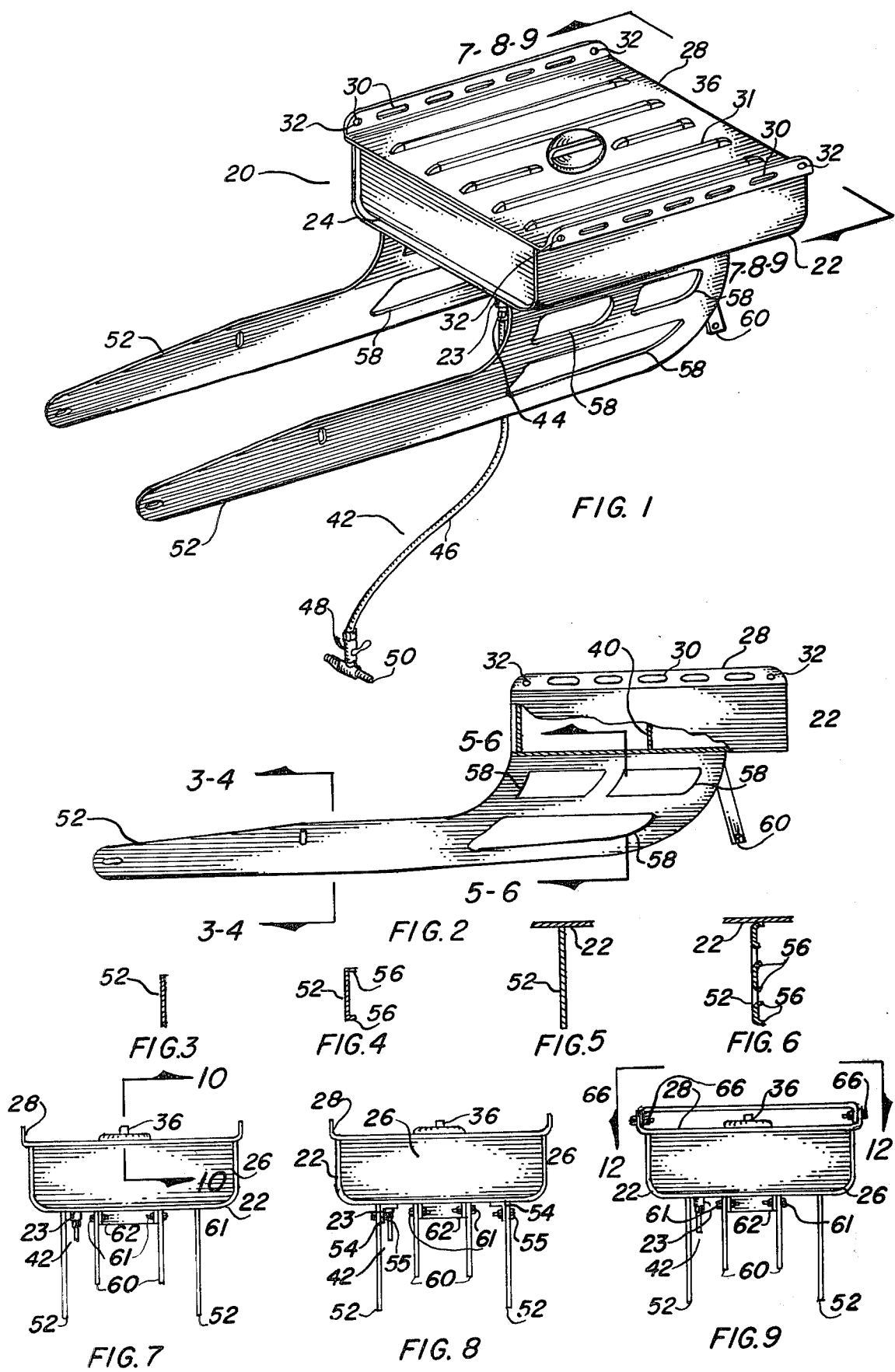

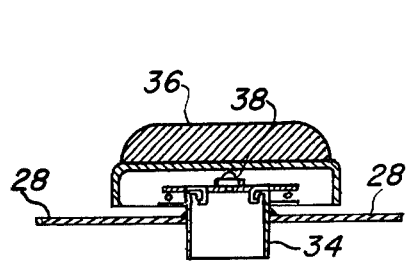
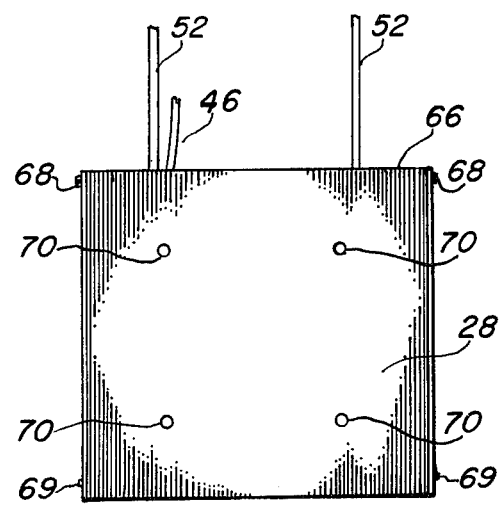
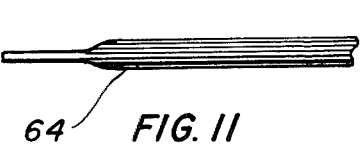
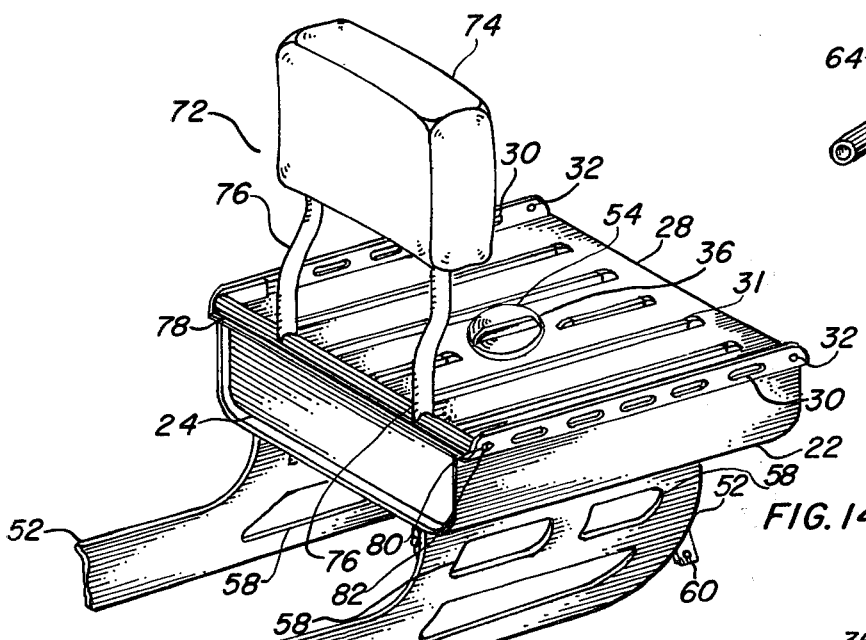
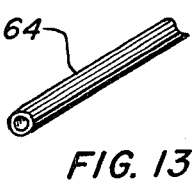
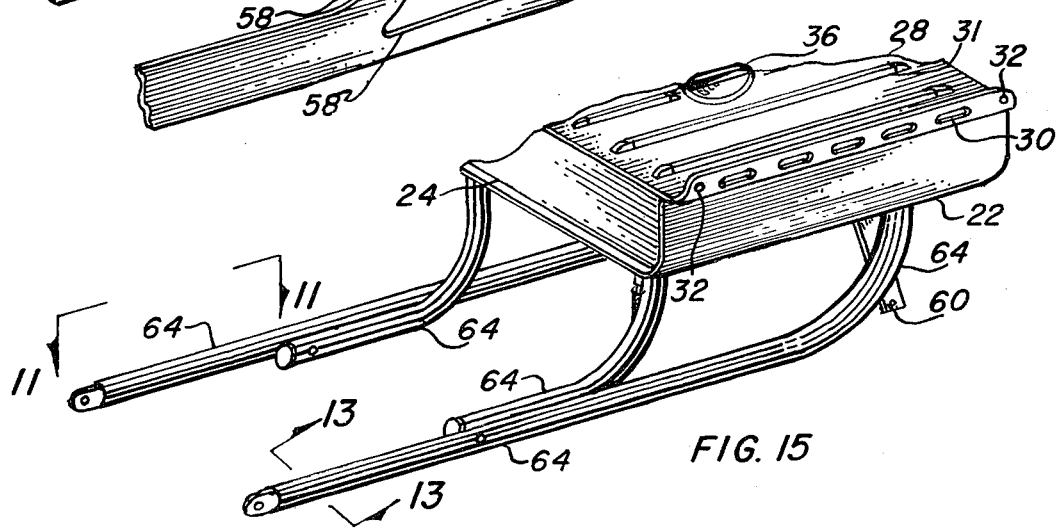

MOTORCYCLE FUEL TANK CARRYING RACK

BACKGROUND OF THE INVENTION

1. Field of the Invention

This invention relates to fuel tanks for motor driven vehicles and luggage racks for motorcycles in general, more particularly to auxillary fuel tanks adapted to motorcycles having an integral luggage rack or frame.

2. Description of the Prior Art

Auxillary storage tanks have long been in use for increasing the fuel capacity of motorized vehicles. In most cases these auxillary tanks for motorcycles have been limited to side bottles or tanks attached to racks. Further, replacement tanks that increase the primary fuel capacity have also been utilized, these are known in the industry as "desert tanks". The position of the auxillary tank is of great importance because limited space is available on a motor driven cycle. The space between the saddle and handlebars is available for "straddle tanks" and under or adjacent to the saddle for side tanks. The need has existed for an alternate location and prior art has not, as yet, filled this need.

Racks to store items above the rear wheel have long been used in a variety of styles and configurations. These include tubular, flat or formed structure, sometimes integral with the original frame or most commonly, added in the after market. These racks provide platforms for attaching and transporting items and also a surface to mount a trunk or box, usually with a hinged and lockable lid. Because of the present energy crisis and fuel shortage, a greater need now exists to provide an auxillary fuel tank for long distance driving and commuter transportation in the metropolitan areas. No prior art presently provides a convenient location for such a fuel tank with sufficient capacity as to fill the above need.

SUMMARY OF THE INVENTION

Previously relatively small auxillary tanks, known as tear drops, have been attached to the sides of a motorcycle. This tank configuration does not supply sufficient capacity to meet the current needs. Therefore, the primary object of the invention is to provide an auxillary fuel tank and integral luggage rack having ample capacity to substantially extend the driving range of a motorcycle.

An important object is that the tank is mounted in a convenient location where it serves as both a fuel container and carrying rack. Conventional luggage racks utilize the space immediately above the rear wheel, whereas the invention combines the function of a rack and tank requiring only a small additional vertical space. As this space is in an unobstructed area, the combination requires no compromise or detrimental effect upon the motorcycles operation. This also allows the rack function to remain intact while advantageously providing a flat carrying surface with fastening slots for attachment.

Another object provides convenient access for filling the tank allowing the fill nozzle to be inserted at any angle easily meeting the strict state governmental air pollution regulations especially for unleaded fuel. Further, this location also fulfills the requirement that spilled fuel must not come in contact with the exhaust system or electrical components.

The weight balance of the motorcycle is little effected by the addition of the apparatus, provided the overall weight limitation for the particular motorcycle is not exceeded. In most cases if the tank holds between 3.5 gallons 13.2 liters and 5.0 gallons 18.9 liters, the effect on the balance is minimal.

Still another object allows the use of a travel trunk by adding a simple channel shaped bracket to the invention. The bracket hinges on the front legs with the trunk attached on the top. This arrangement allows the trunk to be tilted upward from a forward pivot point exposing the filler neck.

Yet another object allows the use of a backrest accessory to be attached to the tank for comfort of the passenger.

The fuel system valve of the invention is within easy reach of the driver allowing it to conveniently open or close while the vehicle is moving.

A further object allows easy retrofit of the tank and rack onto a new or used vehicle as no modification is necessary and the interface occurs where threaded fasteners presently exist.

These and other objects and advantages of the present invention will become apparent from the subsequent detailed description of the preferred embodiment and the appended claims taken in conjunction with the accompanying drawings.

BRIEF DESCRIPTION OF THE DRAWING

FIG. 1 is a partial isometric view of the preferred embodiment.

FIG. 2 is a side view of the preferred embodiment with the fuel system partially removed.

FIG. 3 is a cross sectional view of the preferred embodiment taken along lines 3—3 of FIG. 2.

FIG. 4 is a cross sectional view of another embodiment of the undercarriage arm taken along lines 4—4 of FIG. 2.

FIG. 5 is a cross sectional view of the preferred embodiment taken along lines 5—5 of FIG. 2.

FIG. 6 is a cross sectional view of another embodiment of the undercarriage arm taken along lines 6—6 of FIG. 2.

FIG. 7 is a rear view of the preferred embodiment.

FIG. 8 is a rear view of another embodiment depicting the arm attaching base.

FIG. 9 is a rear view of the preferred embodiment with a mounting channel attached in place.

FIG. 10 is a cross sectional view of the fill pipe and cap taken along lines 10—10 of FIG. 7.

FIG. 11 is a partial view of the undercarriage arm taken in the direction 11—11 of FIG. 15.

FIG. 12 is a view of the preferred embodiment with a mounting channel taken along lines 12—12 of FIG. 9.

FIG. 13 is a partial cross sectional view of the arm taken along lines 13—13 of FIG. 15.

FIG. 14 is a partial isometric view of the preferred embodiment with a backrest attached in place.

FIG. 15 is a partial isometric view of another embodiment with tubular undercarriage arms.

DESCRIPTION OF THE PREFERRED EMBODIMENT

Referring now more specifically to the referenced characters of the drawing, the invention in the preferred embodiment best depicted in FIGS. 1 and 2 includes a tank 20 made of at least 2 separate pieces with 4 being preferred. The tank is comprised of a bottom and side shell 22 in the form of a channel with radiused corners. The corner may be formed square rather than radiused or the channel may be made in 3 separate pieces, however, appearance has dictated a radiused corner for a more pleasing esthetic effect. An outlet drain 23 is located in the bottom of the tank near the forward edge and consists of a coupling or weld flange. This drain 23 has an opening into the tank and is internally threaded to receive the fuel system as described later.

The tank 20 further contains a front wall 24 and a rear wall 26. These walls are affixed to the shell 22 forming a pan. This joint may be located at any convenient intersection, however, an inboard location is preferred allowing the fused or welded joint to be inside the tank not detracting from the overall smooth appearance. Optionally these walls 24 and 26 may be covered with a decorative material such as wood grain vinyl or the like.

The top platform 28 completes the enclosure and is in channel shape with the web contiguous to the sides 22 and walls 24 and 26. The legs of the top 28 are positioned vertically away from the tank and contain a plurality of slots 30 and holes 32. The slots 30 provide attaching points for demountably engaging items that are held down and carried on the top platform 28 with tension tie down devices such as shock cords, straps or rope. These slots 30 are linearly positioned above the platform surface providing easy access for the fastening devices. The shape of the platform 28 provides a flat mounting surface with legs on two sides to partially enclose the carrying surface. Resilient rub-rails 31 may be installed with pressure sensitive adhesive to the top 28 forming a non-slipping surface. These rails may be of any suitable material but synthetic rubber enclosed in thermoplastic is preferred. The holes 32 are provided on each end of the vertical legs to provide interface connections with accessories. The top platform 28 is attached fusibly to the sides 22 and walls 24 and 26 on the outside surface forming a liquid tight box.

The top surface of the platform 28 further contains a fill pipe 34, best illustrated in FIG. 10, consisting of a round neck with a bayonet-type joint. The preferred location for this fill pipe 34 is in the center of the platform 28 allowing complete accessibility for the fuel nozzle. The pipe 34 penetrates the tank 20 and extends the equivalent distance equaling 5% of the tank capacity to allow for thermal expansion. A cap 36 is attached to the fill pipe 34 through the bayonet-type structure. The cap 36 includes an integral check valve 38 that allows an air vent. This operates to provide an air path to the atmosphere during normal conditions allowing the fuel to feed into the engine and displace the liquid with air. The valve 38 closes when liquid is forced internally against the seat, such as sloshing when cornering the motorcycle or an ubrupt stop preventing leakage. The valve will also close in the event the tank is rotated upside down or on its side.

A baffle 40, or plurality thereof, is incorporated into the tank 20 either longitudinally or laterally consisting of a flat member attached to the bottom 22 or walls 24 and 26 containing openings on the periphery to allow limited passage of liquid but deterring the mass flow due to external forces of gravity or inertia. The material of the tank may be aluminum, magnesium, thermoplastic or fiberglass with steel being preferred.

The fuel system 42 provides a flow path for the liquid fuel to be conducted from the tank 20 to the motorcycle engine. A fitting 44 interfaces with the drain 22 and attaches an enclosed conduit in the form of a hose 46.

This hose may be in any convenient form and material such as synthetic rubber, plastic or metal that is compatable with aromatic fuels. The hose 46 is further connected on the other end to a flow shut-off valve 48 that acts to control the flow of fuel. This valve 48 may be the globe, plug, needle, gate or ball type, or the like, in a simple one-way construction or may be 2 or 3-way, as desired, to attach to the motorcycle system. A tee 50 is utilized in the preferred embodiment attached to the valve 48 for conveniently positioning the auxillary tank system to main motorcycle carburator feed. The tee 50 may be of the compression, flare type, or the like, with barbed style being preferred.

The tank 20 is mounted to the motorcycle with a pair of undercarriage arms 52. These arms 52 are planar with the underside of the tank bottom 22 and attached either directly by fusion, welding, or bonding, as shown in FIG. 7, or may have an arm attaching base 54 connected directly to the tank as depicted in FIG. 8. The arm 52 is attached to the base 54 with threaded fasteners 55 providing the mounting means. This latter arrangement provides adjustment and flexibility of using the tanks on different makes and models of motorcycles. The other end of the undercarriage arm 52 is attached directly to the motorcycle chassis. This attachment is normally made by removing the fastening hardware from the rear shock absorbers and the rear fender and interpositioning the arm 52. This provides a rigid mount with sufficient structural integrity to support the tank in a cantilever fashion. The shape of this arm 52 may be flat as depicted in FIGS. 3 and 5 or formed with stiffening edges 56 at both the periphery of the outside and also on decorative lightening openings 58, best shown in FIGS. 4 and 6.

Further structural members to add strength to the mounting arrangement consist of a pair of stabilizer arms 60. These arms 60 are attached to the tank 20 with a stabilizer arm attaching base 62 usually formed in channel shape, welded or bonded to the underside of the tank 20 near the rear with fasteners 61 such as bolts or rivets. The base 62 allows the stabilizers 60 to be displaced angularly to line up generally with the fender or rear tail light of the cycle, however, in some models other appertainances may be utilized. The stabilizer 60 is attached to the motorcycle with threaded fasteners or rivets in a similar manner as the arms 52. These stabilizers, arms and attaching bases are fabricated of any material that has the strength for the purpose this may be flat metal such as aluminum or steel, as shown in FIGS. 1, 3 and 5, or formed of like metal with an edge, as depicted in FIGS. 4 and 6, or may be of tubular metal construction 64 as illustrated in FIGS. 11, 13 and 15. A structural thermoplastic or fiberglass material may also be utilized.

An accessory to the basic tank 20 may be attached in the form of a mounting channel 66, shown best in FIGS. 9 and 12. This channel 66 forms the base for mounting a travel trunk. It is attached to the top platform 28 at the front holes 32 by swiveling compression fasteners 68 such as a nut and bolt with resilient washers, or a pin with nylon washers. This fastener 68 allows the channel 66 to swivel upward away from the top of the tank 20 allowing the cap 36 to be removed and provide access to the fill pipe 34. The opposite end of the platform 28 is provided with quick release fasteners 69 to hold the channel 66 securely. These fasteners 69 may be of the locking bolt type, detent pin, slide bar, or the like, with a spring loaded tapered plug being preferred. The legs of the channel 66 nest between the legs of the top platform 28 and a plurality of holes 20 in the top surface provide attaching points for the trunk.

Another accessory to the basic tank 20 is a backrest 72, best depicted in FIG. 14. This backrest is comprised of a cushion 74 attached to a pair of upright members 76 and a mounting base 78. The base 78 nests between the legs of the top platform 28 and attaches through holes in the base 80 and platform holes 32 with threaded fasteners 82. The construction may be of any suitable metallic shape or thermoplastic molding of the entire assembly 72 with tubular steel or aluminum being preferred.

Although the invention has been described in complete detail and pictorally shown in the accompanying drawings it is not to be limited to such details since many changes and modifications may be in the invention without departing from the spirit and scope thereof hence it is described to cover any and all modifications and forms which may come within the language and scope of the appended claims.

I claim:

1. An auxillary fuel tank and carrying rack for a motor driven cycle comprising;
   a. a tank having a bottom, sides, front wall, rear wall and top platform forming an enclosure to receive and store liquid fuel;
   b. means to transmit fuel from said tank to said cycle;
   c. means to demountably engage items contiguous with said top platform defining a rack having tie down openings for carrying articles attached thereto; and
   d. a plurality of arms having ends engageably mounted on the first end to said tank and demountably secured on the second end to said motor driven cycle.

2. The apparatus as recited in claim 1 in which the tank further comprises;
   a. a drain located on said bottom having a flush threaded opening for attaching said fuel transmitting means;
   b. a fill pipe with attaching means extending sealably into said top platform for receiving fuel into the tank;
   c. a cap moveably engaged onto said fill pipe attaching means to enclose the tank after filling;
   d. at least one baffle securely attached inside said tank having a surface to compartmentalize the interior and openings on the periphery minimizing the movement of fuel within the tank.

3. The apparatus as recited in claim 1 in which the means to transmit fuel further comprises; a conduit for the liquid path having a flow shut-off valve to stop the flow of fuel and a tee to intersect the motor driven cycle fuel line allowing fuel from the apparatus to enter the vehicle fuel system.

4. The invention according to claim 1 in which the arms further comprise;
   a. a pair of undercarriage arms attached on said second end to cycle shock absorber upper mounting bolts and the fender mounting brackets;
   b. a plurality of stabilizer arms attached to said cycle fender and tail light bracket on the second end to provide stability of the tank and transmit load bearing structure from the apparatus to the cycle.

5. The apparatus as recited in claim 1 further comprising; an arm attaching base having one surface affixed to said arm for connecting said first end of the arm to the tank allowing removal therefrom.

6. The apparatus as in claim 1 wherein said means to demountably engage items further comprises; said top platform having vertical legs on at least two sides with a plurality of apertures defining slots and holes located linearly therein providing an interface to receive tension tie down devices when inserted into the slots to hold items in intimate contact with the platform.

7. The invention according to claim 1 further comprising; a mounting channel pivotally attached to said top platform nesting between said vertical legs having a surface with mounting holes to affix a travel trunk thereto for supporting the trunk and allowing axial movement away from the platform to fill said tank with fuel.

8. The apparatus as recited in claim 1 further comprising; a backrest having a cushion, attached to a plurality of upright members and a mounting base, said base having structure of a width to nest between said top platform vertical legs and attach through said holes and a surface contiguous with the platform for support providing a back resting cushion.

* * * * *